United States Patent Office 3,027,237
Patented Mar. 27, 1962

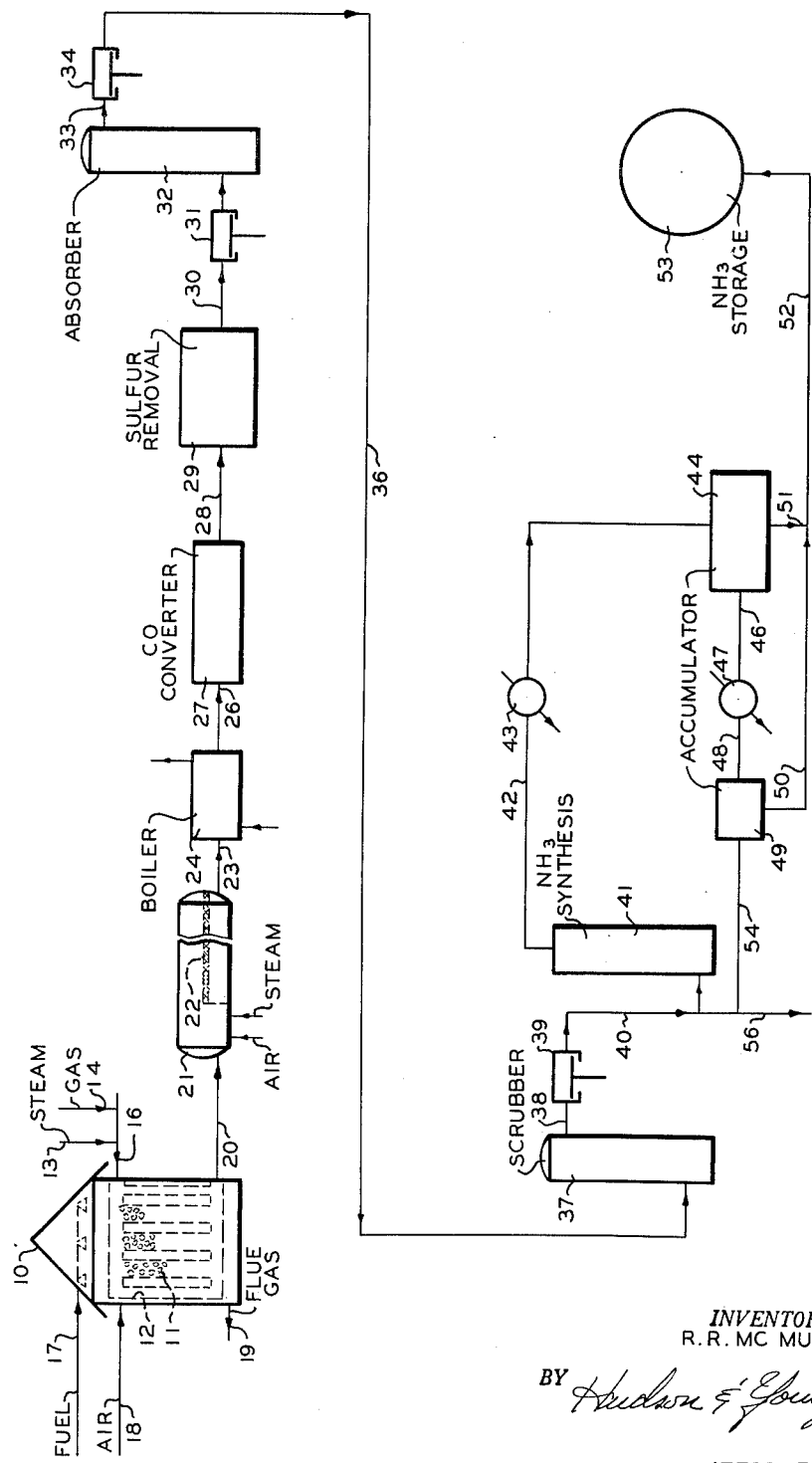

3,027,237
CATALYST REACTIVATION IN THE PRODUCTION OF HYDROGEN FOR AMMONIA SYNTHESIS
Russell R. McMullan, Pasadena, Tex., assignor to Phillips Petroleum Company, a corporation of Delaware
Filed Jan. 5, 1959, Ser. No. 784,906
7 Claims. (Cl. 23—199)

This invention relates to a method of reactivating catalyst used to produce hydrogen from a mixture of steam and hydrocarbon. In one of its more specific aspects this invention relates to an on-stream catalyst reactivation procedure for use in the primary reformer of a synthesis gas unit where steam and natural gas are reacted to produce hydrogen for ammonia manufacture.

The manufacture of hydrogen by the catalytic reaction of steam and hydrocarbons is well known. A well-developed application of this reaction is in the preparation of synthesis gas for ammonia manufacture. In this reaction natural gas which is predominantly methane is reacted with steam in the presence of a nickel catalyst to produce hydrogen and carbon monoxide and/or carbon dioxide. The nickel catalyst can be pure nickel or a promoted nickel catalyst such as nickel chromate or nickel promoted with alumina. The preferred catalyst in such a process is nickel oxide which is reduced to nickel prior to use by reaction with hydrocarbon. As the reaction proceeds the activity of the catalyst tends to decline, probably because of carbon deposition or sulfur poisoning. Carbon deposition causes the catalyst to disintegrate which in turn greatly increases the pressure drop through the catalyst bed.

Although troublesome carbon deposits can be avoided, even a small decline in catalyst activity results in an increase in methane content in the synthesis gas which in turn reduces the efficiency of the ammonia synthesis reaction. An increase of methane in the synthesis gas reduces the capacity of the compressors used to compress the hydrogen and nitrogen prior to synthesis and also necessitates a purge of the synthesis plant cycle gas with a resultant loss of hydrogen and nitrogen. It is estimated that an increase of 1 percent methane in the synthesis gas decreases the potential output of ammonia by about 6 percent.

It is customary to reactivate the catalyst when an activity decline becomes troublesome either by raising the catalyst temperature or by oxidizing the catalyst with steam or a mixture of steam and air. The latter method is preferred because of lower fuel consumption; however, even this method has necessitated diverting the natural gas feed and removing the unit from production for the duration of the oxidation and subsequent reduction procedure.

According to my invention a procedure is provided whereby a gas reforming catalyst can be reactivated without removing the catalyst bed from production. I have discovered that a gas reforming catalyst used to convert a mixture of hydrocarbon and steam to hydrogen gas and carbon oxides can be reactivated by gradually increasing the steam to hydrocarbon feed ratio to a predetermined elevated value, holding this feed ratio at the elevated value for a period of time sufficient to reactivate the catalyst and thereafter returning the feed ratio to about its original value. In general, the reactivation effected by my procedure is complete when a decline in the methane content of the reactor effluent or of the synthesis gas is no longer evident. An essential feature of my invention is the gradual or stepwise increase in the steam to hydrocarbon feed ratio to its ultimate reactivation value. To effect reactivation of a catalyst used to produce hydrogen from a mixture of steam and natural gas the steam to gas ratio in the feed should be increased so that the volume ratio of steam to gas in the reforming zone effluent is increased by about 10 to 40 percent of its original value. The reactivation cannot be carried out satisfactorily by increasing the steam to gas ratio in one step to its ultimate reactivation value. I have found that in order to effect on-stream reactivation it is necessary to increase the steam to gas ratio gradually or in two or more steps. Preferably the amount of increase effective in each step is insufficient to cause a substantial increase in the amount of unreacted methane in the synthesis gas.

It is an object of my invention to provide a method for reactivating a catalyst used to produce hydrogen from a mixture of steam and hydrocarbon. Another object of my invention is to provide a method of reactivating a nickel catalyst used in the preparation of synthesis gas from steam and natural gas for ammonia production. Still another object is to provide a method of performing the above reactivation without shutting down the production unit being reactivated. A further object of my invention is to provide a method of restoring the activity of such a gas reforming catalyst regularly in order to prevent any substantial increases in methane in the synthesis gas. Other objects, advantages and features of my invention will be apparent to those skilled in the art from the following discussion and the drawing which shows schematically the flow of reactants through an ammonia manufacturing process employing steam, air and natural gas as the raw materials.

While my invention can be advantageously applied to reactions employing other light hydrocarbon feed materials in dehydrogenation to produce hydrogen, it is principally directed to processes involving reaction of steam and methane over a nickel catalyst. The invention involves primarily the reforming reaction or conversion of steam and methane to produce hydrogen but its advantages can best be fully appreciated and understood by a discussion of my invention as it relates to the complete process of ammonia synthesis. To explain this process reference is now made to the drawing which shows the flow of material through a typical ammonia manufacturing operation.

A primary reformer 10 is shown containing catalyst 11 in tubes 12 through which a mixture of steam and natural gas is passed. Steam in line 13 and natural gas in line 14 are mixed in conduit 16 and passed into the catalyst tubes of the primary reformer. The catalyst normally employed in this reaction is nickel oxide which is brought to the active state by reducing the oxide. Reduced nickel oxide catalysts are commercially available. One such catalyst contains 27 weight percent nickel plus magnesium oxide, aluminum oxide, calcium aluminates, and silicates with less than 0.03 percent sulfur. The catalyst is heated by the fuel 17 which is burned in the presence of the air 18 and the hot flue gases pass over the outside of catalyst tubes 12 and leave the primary reformer 10 through line 19.

During the startup operation after the catalyst has been charged, normally steam or steam and air is passed through the catalyst while the catalyst temperature is being raised to reaction temperature, generally in the range of about 1225° to 1350° F. The deposition of carbon can be inhibited or depressed during this reduction phase by using a mixture of steam and hydrogen.

The composition of the natural gas feed to primary reformer will vary depending upon the gas source but the gas is primarily, i.e., about 72 to 92 percent, methane with the remainder comprising nitrogen and $C_2$ to $C_5$ hydrocarbons. Natural gas and steam are heated prior to passing over the primary reforming catalyst and generally the natural gas must be first purified to remove sulfur compounds present. The hydrogen sulfide content of the natural gas should not be above 1 part per million since sulfides will poison the reduced nickel oxide catalyst. The pressure in the primary reformer is generally about 35 to 55 p.s.i.g.

It is important that the natural gas always be accompanied by a full proportion of steam and generally the steam should be in sufficient excess so that there is no danger of substantial carbon deposition upon the catalyst. Normally the amount of steam mixed with the gas is about 300 percent of that required for the theoretical complete conversion to carbon monoxide and hydrogen. A substantial amount of steam, therefore, leaves the primary reactor through effluent line 20 in admixture with reaction products of hydrogen, carbon monoxide, and carbon dioxide, plus a small amount of unreacted methane. The feed ratio of steam to reaction gas (purified natural gas) is often given as pounds per hour steam/cubic feet per minute reaction gas. The rates are measured on the feed streams. Another convenient method of determining the proper feed ratio of steam to methane involves measuring the reformer effluent (line 20) in terms of the ratio of steam to dry gas. This volume ratio of steam to dry gas in the primary reformer effluent is referred to frequently in the following discussion.

The effluent stream from the primary reformer is passed to a secondary reformer 21 where it is mixed with additional steam and air sufficient to supply a stoichiometric amount of nitrogen for ammonia synthesis. The secondary reformer also contains a reduced nickel oxide catalyst in a bed 22. The air mixes with the gas stream in converter 21 and combustion follows, raising the temperature of the gas to about 1540° to 1660° F. The pressure in the secondary converter is normally about 3 to 35 p.s.i.g. Combustion plus the conversion of methane and steam to carbon oxides and hydrogen continues in the secondary converter until the amount of methane in the secondary converter effluent is quite low, for example about 0.3 percent. This effluent gas in line 23 contains hydrogen and nitrogen in about a 3 to 1 mol ratio together with carbon monoxide, carbon dioxide and a small amount of inerts such as helium and argon, which entered with the air, plus unreacted methane.

Heat of reaction is recovered in waste heat boiler 24 which is used to generate steam for the reaction and the cooled gases in line 26 pass to a carbon monoxide converter 27 containing iron oxide catalyst. In converter 27 steam and carbon monoxide are reacted to form hydrogen and carbon dioxide. The gases leaving converter 27 in line 28 can, if desired, be further treated with zinc oxide for removal of organic sulfur in zone 29. In installations where most of sulfur is removed from the natural gas feed to the primary reformer, such a second sulfur removal step may not be necessary. The thus produced synthesis gas in line 30 is suitable for ammonia manufacture. It is this synthesis gas exit the carbon monoxide converter (line 28 or 30) which is referred to hereinafter for stream analysis.

This synthesis gas is compressed in a first stage 31 to about 250 p.s.i.g. and then passed through an absorber 32 in which carbon dioxide is absorbed in an amine solution. Alternatively the $CO_2$ can be removed at about 18 to 24 p.s.i.g. with the compression stages positioned downstream from absorber 32. The synthesis gas is then passed through line 33 to a second stage of compression 34 where the pressure is raised to about 1800 p.s.i.g. and then through line 36 to a scrubber 37 where carbon monoxide is removed in a copper-ammonium-formate solution. Synthesis gas leaving scrubber 37 in conduit 38 is passed to a high compression stage 39 where the pressure of the gas is raised to about 5,000 p.s.i.g. and then passed through line 40 to ammonia synthesis reactor 41.

The synthesis gas passing to the reactor contains hydrogen and nitrogen in about a 3 to 1 mol ratio plus inert gases helium and argon and unreacted methane previously mentioned. The synthesis gas is contacted with an iron oxide catalyst in reactor 41 and the effluent in line 42 is cooled in heat exchanger 43. The condensed liquid ammonia is collected in accumulator 44. Uncondensed gases are withdrawn from accumulator 44 through line 46 and are again cooled by exchanger 47 and passed through line 48 to accumulator 49. Condensed ammonia is withdrawn from accumulators 49 and 44 through lines 50 and 51, respectively, and passed through line 52 to ammonia storage 53.

Uncondensed gases are recirculated through line 54 to a synthesis reactor 41. Since the recirculating synthesis gas in line 54 contains inert materials, argon and methane, this circulating gas must be periodically purged through line 56 to prevent the inerts from building up in the system. Unreacted hydrogen and nitrogen are also present in this recirculating stream and represent a loss when such a purge is necessary. It is evident, therefore, that maintenance of the methane content in the synthesis gas at the lowest possible value is highly desirable and this result is made possible by the practice of my invention at regularly scheduled intervals so that the activity of the reforming catalyst is not permitted substantially to decline.

As pointed out previously, the activity of the nickel catalyst in the primary reformer is increased according to my invention by a gradual increase in steam to gas feed ratio. Generally a desirable operating steam to dry gas ratio in the gases leaving the primary reformer (line 20) is in the range of about 0.50 to 0.60 on a volume basis. Reactivation of the catalyst can be effected by increasing this steam to gas ratio by about 10 to 40 percent of its original value and preferably about 15 to 30 percent. It is desirable to keep the increase in this ratio as low as possible so that the residence time of the natural gas in the reactor is not reduced to the extent that unreacted methane becomes a serious problem during the reactivation procedure. Increasing the steam to gas ratio in the primary reformer effluent gas about 15 to 30 percent to a maximum in the range of about 0.60 to 0.70 will effect regeneration of the catalyst. Increasing the steam to gas ratio in a single step, however, will not necessarily increase catalyst activity. According to my invention this increase should be conducted slowly so that any one increase in steam to gas ratio is not over about 6 percent per hour. Preferably the gradual increase in the steam to gas ratio takes place over a period of at least about 3 hours. The gradual increase can last over several days although generally there is no need to prolong this increasing phase of the procedure over more than 10 hours. Preferably the steam to gas ratio is increased about 0.01 to 0.015 per hour. It is convenient to increase the steam to gas ratio by holding the hydrocarbon feed rate constant and increasing the steam rate so that the steam to gas ratio in the reformer effluent increases stagewise as described. This stagewise increase can be controlled by observing the unreacted methane in the synthesis gas and limiting the amount of each increase so that the amount of methane does not substantially increase during the reactivation. Should a reduction in catalyst efficiency as indicated by a drop in secondary reformer catalyst temperature or an increase in unreacted methane be evident after increasing the steam rate, the steam rate should be held constant until the catalyst returns to the activity in evidence prior to the steam rate increase. The steam rate can then be increased another step. Employing several steps at about hour intervals has been found satisfactory. When the ultimate reactivation ratio of steam to gas has been reached it is usually held at this increased level for a period of time, generally exceeding one hour and preferably until there is no further indication of decrease in methane content of the gas leaving the carbon monoxide converter (conduit 28). Reactivation at the elevated steam/gas ratio for about 2 to 16 hours is generally adequate and then the steam/gas ratio can be returned to its original value in one step. When sufficient reactivation occurs during the first phase of the operation, the steam/gas ratio can be return to its normal value in even less time than above indicated. It is possible to reduce the steam/gas ratio gradually or step-wise once reactivation is complete or even to begin gradually decreasing the steam/gas ratio before the catalyst is fully reactivated, completing the reactivation during the period in which the steam/gas ratio is being returned to normal. In order to keep the total reactivation time as short as possible, however, reducing the steam/gas ratio in one step is preferred.

A convenient method of determining when reactivation should be begun involves observing the ratio of methane to argon in the recirculated gases of the ammonia synthesis unit (line 54). Since much of the hydrogen and nitrogen has been removed from this cycle gas, the concentrations of inerts are correspondingly increased to a point where their ratios may be more accurately determined analytically. The methane and argon pass through the hydrogen and ammonia synthesis processes unchanged so that a decrease in the activity of the catalyst in the primary reformer is shown by an increase in the methane/argon ratio in the cycle gas. When the methane to argon ratio in these gases rises above about 1.0 reactivation according to the procedure of my invention can be profitably begun. It has been observed, however, that this methane to argon ratio does not necessarily decrease immediately following termination of the activation procedure, but several hours may elapse after reactivation before this ratio returns to a normal value. The catalyst activity is also reflected by the unreacted methane in the synthesis gas leaving the carbon monoxide converter. Since there is no recirculation at this point changes as a result of my reactivation procedure are more quickly indicated by the methane content of the synthesis gas even though the concentration is lower than in the cycle gas and therefore analytical error is proportionately more significant. It should be understood that the reactions in the secondary reformer and carbon monoxide converter are relatively steady so that catalyst activity in the primary reformer is directly reflected by methane content of the more commonly analyzed synthesis gas exit the carbon monoxide converter. Nevertheless the primary reformer effluent can be analyzed, if desired, and the methane content of this stream used to control the progress of the reactivation.

Since a single change in the steam to gas ratio alone is not sufficient to reactivate the catalyst, the principle by which the gradual or stagewise increase according to my invention operates cannot be conclusively explained. At optimum steam to gas ratios the catalyst activity is slowly reduced and eventually the increased steam to gas ratios are required to reactivate the catalyst. If the highest mentioned steam/gas ratio is maintained long enough, the catalyst activity will begin to decrease, even though an initial increase in activity was gained by increasing the steam to gas ratio.

Since the control of these steam and gas feed ratios is a relatively simple matter and since my reactivation technique can be practiced regularly without removing the catalyst unit from production, the value of my invention will be readily appreciated by those skilled in the art. To further describe my invention the following examples are presented which should be interpreted as being typical and not to limit unduly my invention.

*Example I*

Natural gas containing about 92 volume percent methane is fed at 3000 standard cubic feet per minute with 23,000 pounds per hour steam at 297° F. into a primary reactor containing reduced nickel oxide catalyst in tubes having a diameter of 8⅝ inches and a catalyst bed depth of 26 feet. The catalyst is American Cyanamid Company catalyst type NR which prior to reduction contains 20 weight percent nickel oxide and 80 percent clay reforming catalyst in the form of ¾ inch Raschig rings. The reactor temperature is about 1290° F. and the pressure is about 52 p.s.i.g. The effluent gases are combined with air and steam in a secondary reactor wherein they are contacted with reduced nickel oxide catalyst. The resulting effluent is thereafter contacted with iron oxide catalyst to convert carbon monoxide to carbon dioxide. The thus formed synthesis gas has the following composition in volume percent:

| | |
|---|---|
| Hydrogen | 39.3 |
| Nitrogen | 13.1 |
| Carbon monoxide | 1.6 |
| Carbon dioxide | 10.3 |
| Methane | 0.2 |
| Steam | 35.3 |
| Argon | 0.2 |
| | 100.0 |

The synthesis gas is passed through an amine absorber and thence through a copper liquor scrubber for removal of carbon oxides. The hydrogen and nitrogen are then reacted to form ammonia with the unreacted gases being recirculated to the ammonia reactor. The methane to argon ratio on a volume basis in this synthesis cycle gas is 1.0.

The steam to dry gas ratio on a volume basis in the primary reactor effluent is about 0.55. When the methane to argon ratio in the synthesis cycle gas increases to 1.1 the reaction procedure is begun. At this point there is 1.0 volume percent methane in the synthesis gas exit the CO converter. The steam fed to the primary reactor is increased 600 pounds per hour initially and thereafter every 60 minutes until after 4 hours the steam to gas ratio in the primary reactor effluent is 0.65 on a volume basis. The reaction continues at this new steam to gas ratio for 2 hours after which the steam in the feed is reduced to provide the original steam to gas ratio of 0.55 in the reformer effluent. As a result of the reactivation the methane in the synthesis gas is reduced to 0.2 volume percent.

*Example II*

Operating generally as described in Example I with a feed gas ratio of about 7.6 pounds of steam per hour/cubic foot per minute reaction gas to the primary reformer of a commercial ammonia plant the methane/argon ratio in the synthesis cycle gas began increasing from 1.2 until in three days the ratio was 2.4. The steam/gas ratio was increased about 18 percent in one step to 9.0 pounds per hour steam/cubic foot per minute of reaction gas. This caused the methane to argon ratio in the synthesis cycle gas to increase to 3.4 in 14 hours. It is thus evident that increasing the steam/gas ratio alone does not necessarily increase the catalyst activity. The above data show that a single increase in the steam/gas ratio of about 18 percent was ineffective and in fact detrimental to synthesis cycle gas quality.

*Example III*

During a run similar to that of Example I, with a reaction gas feed of 2670 c.f.m. and a steam/gas feed ratio of 8.9 pounds per hour steam/c.f.m. reaction gas, as the unreacted methane in the synthesis gas reached 1.1 volume percent the steam feed rate was increased step-wise about 600 pounds per hour at 4 hour intervals while holding the reaction gas rate at 2670 c.f.m. to a final steam/gas ratio of 9.8 pounds per hour steam/c.f.m. reaction gas. The unreacted methane in the synthesis gas decreased to 0.7 percent. The volume ratio of steam to dry gas in the primary reactor effluent was about 0.55 before reactivation was begun and about 0.60 when the unreacted methane in the synthesis gas dropped to 0.7 volume percent. The steam/gas ratio in the reactor effluent was returned to 0.55 as the unreacted methane in the synthesis gas dropped still further to 0.5 volume percent.

This result was quite surprising in view of the experience of Example II and showed conclusively that reformer catalyst can be reactivated by manipulating the steam/gas feed ratio if done according to my invention.

As will be evident to those skilled in the art, various modifications of this invention can be made, or followed, in the light of the foregoing disclosure and discussion, without departing from the spirit or scope thereof.

I claim:

1. A method of reactivating a nickel reforming catalyst used to convert a mixture of hydrocarbon and steam to hydrogen gas and carbon oxides which comprises gradually increasing the steam-hydrocarbon feed ratio to a reaction zone containing said nickel reforming catalyst until reactivation is complete, passing an effluent stream from said reaction zone, the steam-dry gas ratio of the reaction zone effluent stream not to exceed 0.70, and thereafter returning said feed ratio to its normal value.

2. The process of claim 1 wherein said ratio is increased by holding the hydrocarbon feed rate constant and increasing the steam feed rate.

3. A method of restoring the activity of reduced nickel oxide reforming catalyst used to produce hydrogen gas from a mixture of steam and natural gas in a reforming zone which comprises increasing the steam to gas ratio in the feed to said reforming zone so that the steam to gas volume ratio exit said zone is increased by about 10 to 40 percent of its original value, said increasing being gradual over a period of at least about 3 hours, with no single increase being greater than about 6 percent per hour, holding said steam to gas ratio at the highest level for a period exceeding 1 hour and then returning said ratio to its original value.

4. A method of reactivating reduced nickel oxide catalyst being used in a reforming zone to produce hydrogen from a mixture of steam and methane which comprises increasing the amount of steam in said mixture in a series of steps at about hour intervals so that the volume ratio of steam to other gases in said reforming zone effluent increases by about 15 to 30 percent of its original value over about 3 to 10 hours with no single increase being greater than about 6 percent per hour, holding said steam to gas ratio at the high value for about 2 to 16 hours and reducing said ratio to its original value in one step.

5. In a process wherein a mixture of steam and natural gas predominantly methane is passed over reduced nickel oxide catalyst at elevated temperature to produce hydrogen gas, the effluent stream from said process comprising steam and gas including hydrogen, methane and carbon oxides, the improved method of reactivating said catalyst on stream which comprises increasing the ratio of the steam to gas in said mixture until the steam to gas volume ratio in said effluent has increased by about 15 to 30 percent of its original value, said increasing being done gradually so that the unreacted methane in said effluent does not substantially increase, holding said ratio at its higher value until said unreacted methane no longer decreases, and returning said ratio to its original value.

6. In an ammonia synthesis process wherein a mixture of steam and methane is passed over reduced nickel oxide catalyst at elevated temperature to form a primary effluent containing steam and gas including hydrogen, carbon oxides and methane, said primary effluent is mixed with air and more steam and again contacted with reduced nickel oxide catalyst at a still higher temperature to form a secondary effluent containing hydrogen, nitrogen, carbon oxides, steam and methane, said secondary effluent is contacted with iron oxide catalyst to react steam and carbon monoxide to form additional hydrogen and carbon dioxide, the thus formed synthesis gas is treated to remove carbon oxides, and passed to an ammonia synthesis reactor, ammonia is condensed from the reactor effluent and the uncondensed gases are recirculated to said reactor, a portion of said uncondensed gases being purged to prevent inerts such as methane and argon from building up in the system, the improved method of reactivating said first mentioned reduced nickel oxide catalyst which comprises increasing the steam feed in said mixture in multiple steps at about 1 hour intervals so that the steam/gas volume ratio in said primary effluent increases from an original value in the range of about 0.50 to 0.60 in increments of about 0.01 to 0.015 to an ultimate value in the range of about 0.60 to 0.70, maintaining said ratio at said ultimate value for about 2 to 16 hours and then returning said ratio to said original value in one step.

7. The process of claim 6 wherein said reactivation is begun when the volume ratio of methane to argon in said recirculated uncondensed gases rises above about 1.0.

References Cited in the file of this patent

UNITED STATES PATENTS

| | | |
|---|---|---|
| 1,904,441 | Freyermuth et al. | Apr. 18, 1933 |
| 1,915,363 | Hanks et al. | June 27, 1933 |
| 1,992,909 | Davis | Feb. 26, 1935 |
| 2,610,106 | Gray | Sept. 9, 1952 |
| 2,906,792 | Kilpatrick | Sept. 29, 1959 |